UNITED STATES PATENT OFFICE 2,323,226

PREPARATION OF 2-CHLOROBUTENE-2

Arthur A. Levine and Oliver W. Cass, Niagara Falls, N. Y., assignors to E. I. du Pont de Nemours & Company, Wilmington, Del., a corporation of Delaware No Drawing. Application October 12, 1938, Serial No. 234,691

4 Claims. (Cl. 260—654)

This invention relates to the preparation of 2-chlorobutene-2 and more particularly to its preparation by the thermal decomposition of 2,3-dichlorobutane.

We have discovered that 2-chlorobutene-2, a colorless liquid having a reported atmospheric boiling point of 62 to 63° C., may be prepared in a practical manner by the pyrolysis of 2,3-dichlorobutane to the exclusion of other isomeric monochlorobutenes, providing a suitable temperature and pyrolysis catalyst are employed. Accordingly, it is an object of the present invention to provide a practical method for the vapor phase pyrolysis of 2,3-dichlorobutane to give 2-chlorobutene-2. A further object is to provide a pyrolysis catalyst which may be employed in the above method so that the formation of 2-chlorobutene-2 may be effected without substantial formation of other monochlorobutenes. These and other objects of this invention will be apparent from the ensuing description thereof.

The above objects may be accomplished in accordance with the present invention by subjecting 2,3-dichlorobutane to vapor phase pyrolysis in the presence of an alkaline earth metal halide as catalyst. The metal halide catalyst may be supported on any catalyst support commonly used in this type of reaction; however, we prefer to employ activated charcoal as the catalyst support. Among the many other materials that may serve as a support for the barium chloride are silica gel, alumina gel, chips of porous ceramic materials and the like. When employing such a catalyst, e. g. barium chloride supported on activated carbon, and when subjecting vapors of 2,3-dichlorobutane to the action of heat at a temperature of 200–300° C. the dichlorobutane is catalytically decomposed to produce 2-chlorobutene-2 to the exclusion of other isomeric monochlorobutenes.

Any alkaline earth metal halide may be employed as catalyst in accordance with our invention, however, we prefer to employ an alkaline earth metal chloride, particularly barium chloride. Furthermore, we have found that barium chloride supported on activated charcoal is an especially effective catalyst for use in practicing the present invention.

While temperatures within the range of 200–300° C. may be employed in practicing our invention, we prefer to employ a temperature within the range 215–235° C. since within this range pyrolysis of the dichlorobutane proceeds at a practical rate and the splitting off of two mols of hydrogen chloride instead of the desired one mol is not excessive. Higher temperatures, e. g. 235–300° C. may be employed with good results although at the higher temperatures the formation of di-olefines tends to increase.

While there are numerous methods for effecting elimination of hydrogen chloride generally from chlorohydrocarbons, most of these methods are not generally applicable to dichlorohydrocarbons, e. g. 2,3-dichlorobutane, when the desired product is a specific monochloro olefine. This is because the course of dehydrochlorination by these prior methods is difficult to control, and the resulting product generally consists of a mixture of substantial amounts of isomeric monochloro compounds, frequently together with considerable amounts of di-olefines. We have now found that the use of alkaline earth metal halides and particularly the chlorides e. g. barium chloride, as catalyst for the vapor phase pyrolysis of dichlorobutane at a temperature within the range noted above is especially advantageous in that a controlled dehydrochlorination may be accomplished thereby. Thus, substantially no by-product monochlorobutenes, are formed when using this catalyst at a suitable temperature and by-product di-olefines are not obtained in excessive amounts.

The dehydrochlorination of 2,3-dichlorobutane by our present method is conveniently carried out at normal pressure, although sub or superatmospheric pressures may be employed in accordance with our invention.

The present invention is illustrated by the following example.

Example

One gram molecular weight of 2,3-dichlorobutane was distilled through a reaction space heated to a temperature of about 200–250° C., the mean temperature being about 220° C. This reaction space was previously filled with activated charcoal impregnated with barium chloride. The vapors issuing from the reaction space were passed through a fractional condenser, a water scrubber for removing hydrogen chloride and finally through an ordinary water-cooled condenser. The first condenser functioned to remove from the off-gases unconverted dichlorobutane which was again vaporized and recirculated through the reaction space. The desired 2-chloro-butane-2 which passed through the fractional condenser was condensed partly in the water scrubber and partly by means of the final water-cooled condenser. The reaction time was 1¾ hours and the product obtained from the water scrubber and final condenser was substantially free from any monochlorobutene other than 2-chloro-butene-2, the desired product. A small amount of butadiene was noted to be formed. The absence of isomeric monochlorobutenes was established by distillation analysis of the crude product obtained and by the preparation of 2,2,3-trichlorobutane by direct addition of chlorine to the product.

The 2,3-dichlorobutane employed as raw material for the present method may be obtained from any desired source and, if an especially pure product is desired, should be of high purity. This compound may be conveniently secured by chlorinating butene-2 employing known methods.

The advantages of the present method for preparing 2-chloro-butene-2 are that the pyrolysis reaction may be effected in a convenient manner and without the formation of substantial quantities of by-product isomeric compounds. It is well known that generally dehydrochlorination of dichlorohydrocarbons such as 2,3-dichlorobutane proceeds in various manners so that a mixture of several products generally results and is expected. According to the present method no substantial amount of by-product monochlorobutenes are formed which is obviously highly advantageous.

It is obvious that many widely different modifications of this invention may be made without departing from the spirit and scope thereof. It is therefore intended that the invention be not limited except as indicated in the appended claims.

We claim:
1. The method of preparing 2-chloro-butene-2 comprising contacting vapors of 2,3-dichlorobutane with barium chloride at a temperature of 200 to 300° C.
2. The method of preparing 2-chloro-butene-2 comprising contacting vapors of 2,3-dichlorobutane with barium chloride at a temperature of 215 to 235° C.
3. The method comprising passing vapors of 2,3-dichlorobutane through a reaction space at a temperature of 200 to 300° C. in the presence of activated carbon impregnated with barium chloride.
4. The method comprising passing vapors of 2,3-dichlorobutane through a reaction space at a temperature of 215 to 235° C. in the presence of activated charcoal impregnated with barium chloride, recirculating unconverted dichlorobutane from the resulting off gases through said reaction space and separating 2-chloro-butene-2 from said off gases.

ARTHUR A. LEVINE.
OLIVER W. CASS.